United States Patent
Chan

(10) Patent No.: US 6,470,077 B1
(45) Date of Patent: Oct. 22, 2002

(54) APPARATUS AND METHOD FOR STORAGE AND ACCELERATED PLAYBACK OF VOICE SAMPLES IN A CALL CENTER

(75) Inventor: Norman C. Chan, Louisville, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/524,023

(22) Filed: Mar. 13, 2000

(51) Int. Cl.[7] .................................................. H04M 1/64
(52) U.S. Cl. ................. 379/88.01; 379/80; 379/265.01; 379/69
(58) Field of Search ........................... 379/67.1, 68, 69, 379/70, 79, 80, 85, 88.01, 88.22, 265.01, 265.07, 265.13, 266.02, 372, 386

(56) References Cited

U.S. PATENT DOCUMENTS

| | | | | |
|---|---|---|---|---|
| 4,809,272 A | * | 2/1989 | Torgrim et al. | 370/110.3 |
| 5,311,588 A | * | 5/1994 | Polcyn et al. | 370/377 |
| 5,371,787 A | * | 12/1994 | Hamilton | 379/386 |
| 5,396,542 A | * | 3/1995 | Alger et al. | 379/67.1 |
| 5,533,103 A | * | 7/1996 | Peavey et al. | 379/69 |
| 5,675,639 A | * | 10/1997 | Itani et al. | 379/351 |
| 5,724,420 A | * | 3/1998 | Torgrim | 379/372 |
| 5,828,731 A | * | 10/1998 | Szlam et al. | 379/88.16 |
| 6,208,970 B1 | * | 3/2001 | Ramanan | 704/270 |
| 6,282,284 B1 | * | 8/2001 | Dezono et al. | 379/265.09 |
| 6,332,154 B2 | * | 12/2001 | Beck et al. | 709/204 |

* cited by examiner

Primary Examiner—Scott L. Weaver
(74) Attorney, Agent, or Firm—Sheridan Ross P.C.

(57) ABSTRACT

A call center includes a recording/playback unit for recording audible signals received (during an outgoing call) from a remote party location, while a call classifier unit within the call center processes the audible signals. A call processing unit places a call to a remote party location via a communication network to attempt to elicit a desired response from the remote party. The call classifier then processes audible signals received from the remote party location to determine whether or not the call was answered by a live party. The audible signals are recorded by the recording/playback unit and are placed in a queue while the call classifier processes the audible signals. If the call classifier determines that the call was answered by a live party, the call processing unit completes a path between the recording/playback unit and a local agent at the call center, and the recorded audible signals from the remote party are played back to the agent in an accelerated fashion. Meanwhile, the queue is being filled with incoming audible signals at normal speed. Once the queue of recorded audible signals has been emptied, the call processing unit establishes a realtime path between the remote party location and the local agent. If the call classifier determines that the call was not answered by a live party, the call processing unit will terminate the call.

21 Claims, 3 Drawing Sheets

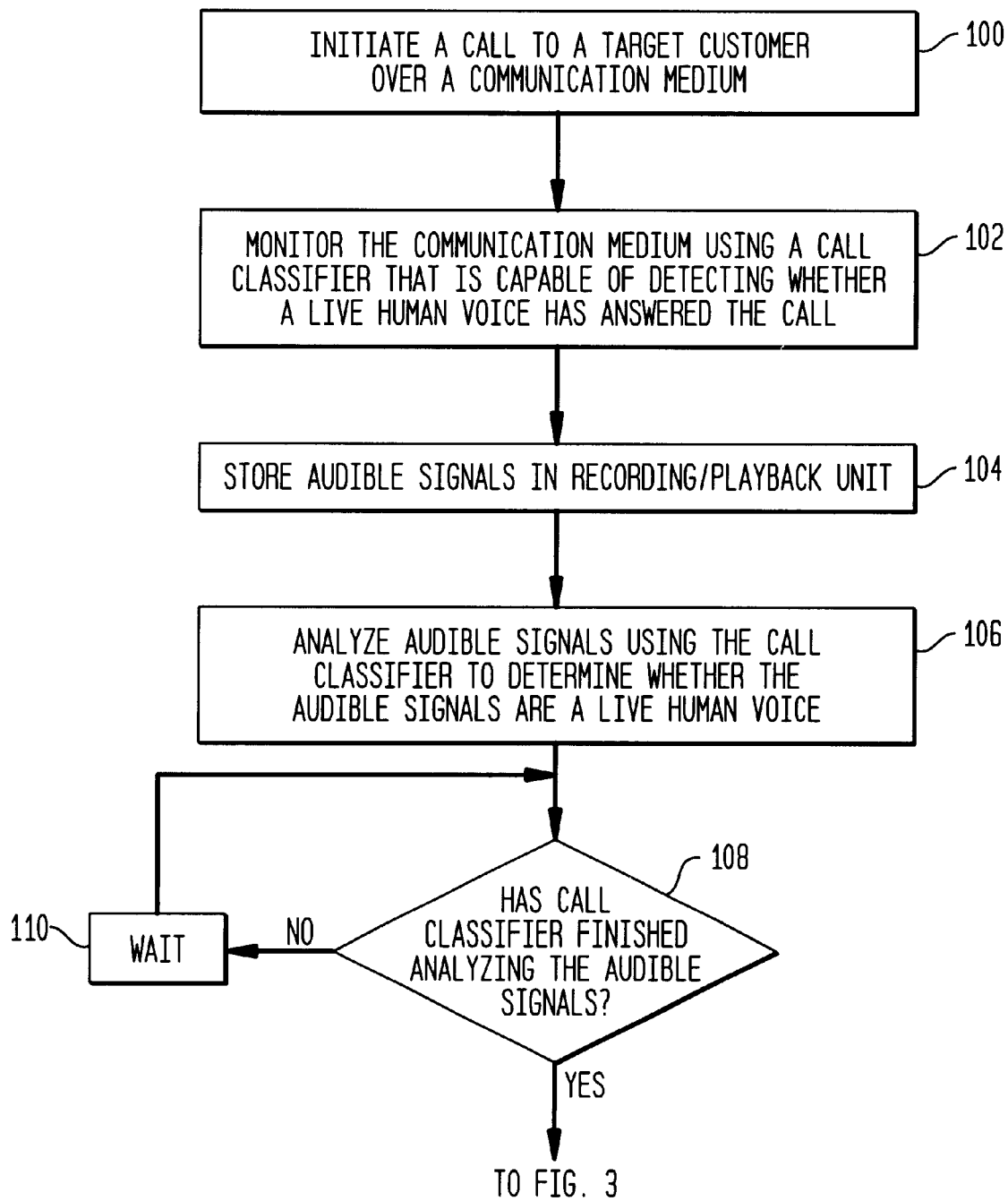

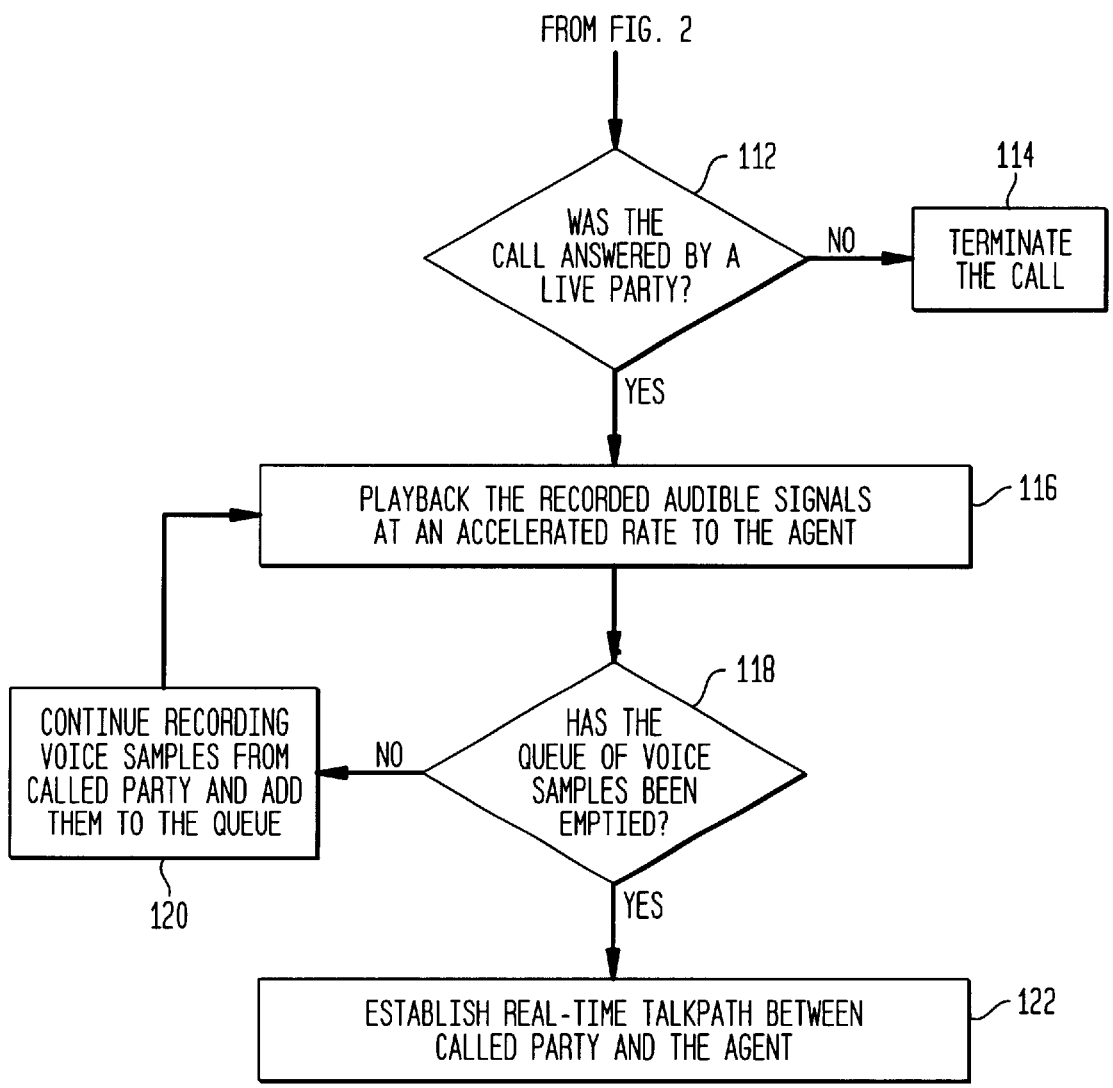

APPARATUS AND METHOD FOR STORAGE AND ACCELERATED PLAYBACK OF VOICE SAMPLES IN A CALL CENTER

TECHNICAL FIELD

The present invention relates generally to call centers, and more particularly, to call handling systems for use in call centers.

BACKGROUND OF THE INVENTION

Among other things, a call center may be used to place outgoing calls to parties from whom a predetermined response is desired. The desired response can be, for example, an answer to a question or the purchase of a product or service. When the outgoing call is answered, a call classifier unit is commonly used at the call center to determine whether a person (i.e., a live party) has answered the call or whether a machine (e.g., a telephone answering machine or fax machine, etc.) has answered the call. If the call classifier determines that a live party has answered the call, control of the call is switched to a live agent at the call center who handles the remainder of the call. If the call classifier determines that the call was not handled by a live party, the call is terminated or alternative action is taken.

To make its determination, the call classifier unit usually processes the first few seconds of audible signals received over the telephone line after the call has been answered. For example, a person answering a telephone may say "hello, this is Norm speaking" into the receiver. The call classifier will process the "hello, this is Norm speaking" signal. Assuming the call classifier properly determines that a live party has answered the call, control of the call is then switched to a live operator. Unfortunately, due to the call classification process, the first few seconds of the live party's voice will be lost before the call is connected. Some of this lost information may be extremely useful (e.g., that the agent is talking to "Norm"). In addition, the loss of such information may cause confusion and aggravation since re-introductions may be required. As can be appreciated, this can degrade overall call center performance.

In addition, because the first few seconds of a live party's voice (and hence the information contained therein) are lost during the call classification process, call classifiers are given a short period of time to determine whether a live party has answered the call. Because of this, not surprisingly, call classifiers may not reach the correct conclusion.

Accordingly, there is a need for a method and apparatus that will enhance call center performance by providing call center agents with voice samples of a called party that are used during the call classification process. In addition, there is a need for a method and apparatus which will allow call classifiers additional time to determine whether a live party has answered a call, without losing the information included within the voice samples used to make such determination.

SUMMARY OF THE INVENTION

The present invention relates to a method and apparatus that is capable of increasing outgoing call success rates in a call center. The method an apparatus stores audible signals received during a call (e.g., a called party's voice samples) while a call classifier processes such audible signals. If the call classifier determines that a live party has been reached, control of the call is switched to an agent and the stored voice samples are played to the agent at an accelerated rate, so that information provided by the called party during the call classification process is provided to the agent (i.e., it is not lost).

BRIEF DESCRIPTION OF THE DRAWINGS

FIGS. 2 and 3 are portions of a flowchart illustrating a process for managing an outgoing call in a call center in accordance with one embodiment of the present invention.

DETAILED DESCRIPTION

Figure 1:
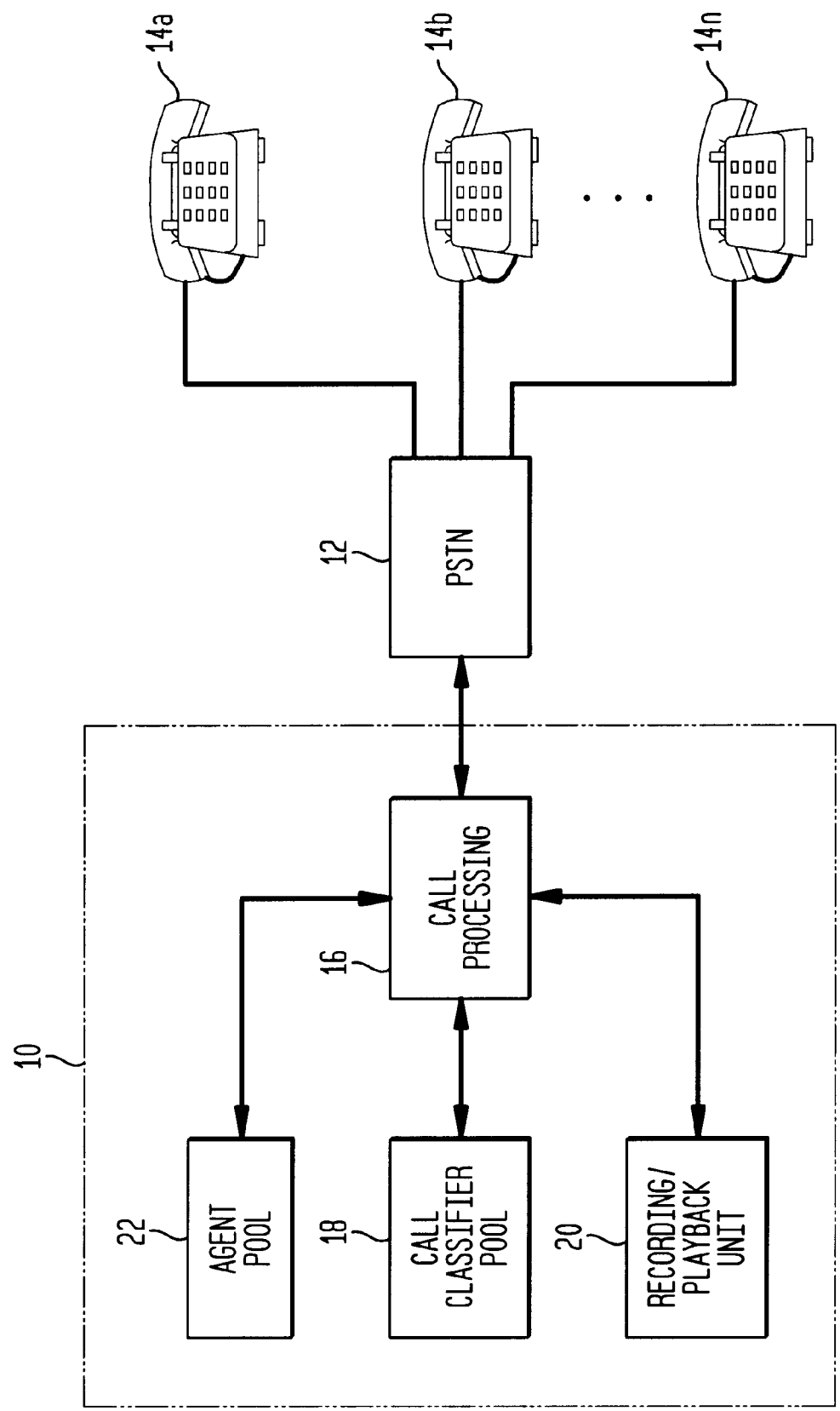
FIG. 1 is a block diagram illustrating a call center in accordance with one embodiment of the present invention.

FIG. 1 is a block diagram illustrating a call center 10 in accordance with one embodiment of the present invention. The call center 10 is coupled to a public switched telephone network (PSTN) 12 for use in placing calls to any of a multitude of remote user devices 14a, 14b, . . . , 14n. As illustrated, the call center 10 includes: a call processing unit 16, a pool of call classifier units 18, a recording/playback unit 20 and a pool of human agents 22. During normal operation, calls are placed from the call center 10 to predetermined parties at the remote user devices 14a, 14b, . . . , 14n to attempt to obtain a desired response from the called parties. For example, it may be desired to have a party subscribe to a particular service or purchase a particular product. Alternatively, it may be desired that the called party answer some questions or complete a survey. The performance of the call center 10 will normally be gauged by the number of calls that are successfully handled within a predetermined period of time. Thus, it is very important that the number of calls that are prematurely terminated due to aggravation or confusion be minimized.

With reference to FIG. 1, the call processing unit 16 manages placement and processing of calls and the recording of responses within the call center 10. When the call processing unit 16 determines that a call needs to be placed to a predetermined party, it dials a telephone number associated with the party to establish a communications connection with the party via PSTN 12. At the same time, or slightly thereafter, the call processing unit 16 assigns a call classifier from the call classifier pool 18 to the call for use in classifying audible signals received from the called party location during the call. The call classifier detects when the call has been answered and then waits for audible signals from the called party location. When audible signals are detected (e.g., "Hello, this is Norm speaking"), the call classifier (assigned to the call) processes the signals to determine whether the signals have originated from a live party or from a machine, such as an automated telephone answering machine. When the call classifier has completed processing of the audible signals, it delivers the results of the processing to the call processing unit 16. If the call classifier indicates that the call was answered by a live party, the call processing unit 16 immediately patches a waiting agent from the agent pool 22 into the connection to handle the call. If the call classifier indicates that the call was not answered by a live party, the call processing unit 16 terminates the call or takes other action.

As can be appreciated, the processing performed by the call classifier includes some inherent processing delay to ensure accurate call classification. Thus, after the call classifier has received audible signals from the called party location, there is typically a period of time before the call processing unit 16 knows whether a live party has answered. If no measures were taken to store the audible signals used to classify the call, the information included in the audible signals would be lost and the agent from the agent pool 22 would not have the benefit of such information. Therefore, in accordance with the present invention, the call processing unit 16 forwards the audible signals to the recording/playback unit 20 as the call classifier is making its determination. If the call classifier indicates that a live party has answered the call, the call processing unit signals the recording/message playback unit 20 to playback the recorded audible signals to the agent. Subsequently, the call processing unit connects the agent to the call. Because the audible signals used during the call classification process are being stored and, therefore, will not be lost, the call classifier of the present invention will be given adequate time to reach a more accurate conclusion as to whether the call has been answered by a live party or not.

In a preferred approach, playback from the recording/playback unit 20 occurs at an accelerated rate so that the delay due to the call classification process is not equivalently propagated to the agent. There are many ways to accelerate the playback of the recorded voice samples. For example, either the call processing unit 16 or the recording/playback unit 20 (or other some other separate structure) could eliminate (or reduce) some or all of the silent intervals between voice samples, either before recording the voice samples or while the voice samples are being played back. As another alternative, the playback may be accelerated by the call processing unit 16 or the recording/playback unit 20 by speeding up the playback of the voice samples, preferably, without altering the pitch of the voice samples.

The process of recording and playing back voice samples at an accelerated rate may continue even after the call classification process. Preferably, the voice samples are placed in a queue in the recording/playback unit. The voice samples would continue to be recorded and played back at an accelerated rate until no further voice samples remained in the queue. In other words, the agent would be switched over to realtime speech of the called party after the recording/message playback unit 20 has allowed the agent to "catch up" with the called party.

To determine when the agent should be switched to the called party's realtime speech, the queue could simply be monitored and, when the queue was found to be empty, the agent could be switched over. As another alternative, call processing unit 16 might be used to determine the amount of time it took for the call classifier to classify a particular call. In such case, the call processing unit 16 would also monitor the recording/playback unit 20 to determine whether the amount of accelerated playback was such that it was equal to (or greater than) the amount of time it Look for the call classifier to classify the call. When such condition was met, the agent would be switched to the called party's realtime speech.

It should be understood that if the call classifier determined that a live party was not reached, the audible signals stored in the recording/playback unit 20 would be erased (or discarded in some other way).

In a preferred embodiment, the call processing unit 16 is implemented using a programmable digital processing device, such as a general purpose microprocessor or a digital signal processor. The call classifiers within the call classifier pool 18 can be implemented in hardware or software. Call classification structures and techniques are generally well-known in the art. The recording/playback unit 20 can include virtually any form of device that is capable of recording and playing back stored voice signals in response to control signals from, for example, call processing unit 16. For example, a conventional analog tape recorder device may be used. Alternatively, a device that is capable of recording and playing back digitized voice signals stored in, for example, a mass storage device associated with the call processing unit 16 can be used as the recording/playback unit 20. In addition, accelerated playback (which includes compressed recording) of the voice samples may be performed by software and/or hardware either in the recording/playback unit 20 or in the call processing unit 16 (or an associated device).

The agents within the agent pool 22 are preferably human employees of the call center that are trained to solicit desired responses from the public. Each agent will normally be stationed at a computer terminal and wear a telephone headset during normal call center operations. In a preferred approach, an agent will be notified beforehand when a call has been placed for which the agent will be responsible once a live party answers the call. In some cases, the call processing unit 16 will wait for confirmation from the agent before a call is placed to ensure that the agent is ready. The computer terminal used by the agent can be a terminal of the digital processing device implementing the call processing function 16.

FIGS. 2 and 3 are portions of a flowchart illustrating a method for storage and accelerated playback of voice samples within a call center. With reference to FIG. 2, a call to a target customer is first initiated over a communication medium (step 100). The communication medium can include a link with a public switched telephone network (PSTN) or any other communication network that is capable of supporting voice communication. Some types of communication networks that can be used in accordance with the present invention include, for example, a satellite communications network, an optical fiber communication network, a local area network, a wide area network, a municipal area network, a private branch exchange network, the Internet and/or a terrestrial wireless network.

Next, the communication medium is monitored using a call classifier to detect and classify signals from the called party location (step 102). The call classifier is capable of processing a received signal to determine whether the signal originated from a live party or from a machine.

After audible signals are detected from the first party location, audible signals are stored in a queue in a recording/playback unit (step 104) or similar device. Analysis of the audible signals is simultaneously initiated within the call classifier to determine whether the audible signals are a live human voice (step 106).

It is next determined whether the call classifier has finished analyzing the audible signals (step 108). If not, the method waits for the analysis to be completed (step 110), while continuing to store further audible signals in the queue of the recording/playback unit. The call classifier eventually makes a determination as to whether audible signals are a live human voice or not.

Referring now to FIG. 3, if audible signals are determined to be other than a live human voice, the call is terminated (steps 112 and 114). If the audible signals are determined to be a live human voice, the recording/playback unit plays back the recorded audible signals (i.e., voice samples) at an accelerated rate to the agent (step 116).

Next, a determination is made as to whether the queue of voice samples in the recording/playback unit has been emptied (step 118). If the queue has not been emptied, the recording/playback unit continues to store voice samples from the called party and adds such voice samples to the queue (step 120), which are played back at an accelerated rate to the agent (step 116). Once the queue has been emptied, a realtime talk path is established between the called party and a local agent within the call center (step 122). The local agent then handles the remainder of the call.

Although the present invention has been described in conjunction with its preferred embodiments, it is to be understood that modifications and variations my be resorted to without departing from the spirit and scope of the invention as those skilled in the art readily understand. Such modifications and variations are considered to be within the purview and scope of the invention and the appended claims.

What is claimed is:

1. A method of managing a call comprising the steps of:
    monitoring the call for receipt of audible signals from a party to the call;
    detecting the audible signals received from the party;
    storing the received audible signals;
    processing the received audible signals to determine if they are live voice signals; and,
    if the received audible signals are determined to be live voice signals, providing the stored received audible signals to a call-handling agent and connecting the call to the agent.

2. The method of claim 1 wherein the stored received audible signals are provided to the call-handling agent in an accelerated fashion.

3. The method of claim 2 wherein said stored received audible signals include voice samples and said stored received audible signals are provided to the call-handling agent in an accelerated fashion by eliminating at least one silent interval between adjacent voice samples.

4. The method of claim 2 wherein said stored received audible signals are provided to said call-handling agent in an accelerated fashion by speeding up playback of said audible signals, which include voice samples.

5. The method of claim 4 wherein playback is accelerated by a recording/playback unit.

6. The method of claim 4 wherein playback is accelerated by a call processing unit.

7. The method of claim 1 further comprising the step of:
    if the received audible signals are determined not to be live voice signals, terminating the call.

8. The method of claim 1 wherein said received audible signals are stored in a queue and said method further comprises the step of:
    determining whether the queue has been emptied.

9. The method of claim 8 further including the step of:
    establishing a realtime talk path between the called party and the agent when said queue has been emptied.

10. The method of claim 8 further including the step of:
    continuing to store said received audible signals by adding them to the queue.

11. The method of claim 10 wherein said queue is emptied by providing the stored received audible signals to the call-handling agent in an accelerated fashion.

12. A system for use with a call center comprising:
    a call processing unit for use in placing a call to a remote party location via a communication network;
    a call classifier unit for analyzing signals received from said remote party location to determine whether said signals originated from a live party during the call; and,
    a recording/playback unit for recording at least a portion of said signals received from said remote party location while said call classifier unit processes said signals.

13. The system of claim 12 further including a switch unit for establishing a first path between a local agent position and said recording/playback unit when it is determined by said call classifier unit that said signal originated from a live party during the call.

14. The system of claim 13 wherein said recording/playback unit plays back to said agent at least a portion of said recorded signals received from said remote party location.

15. The system of claim 14 wherein said recorded signals are played back in an accelerated fashion.

16. The system of claim 15 wherein said recorded signals are stored in a queue in the recording/playback unit.

17. The system of claim 16 wherein the switch unit establishes via a second path a connection from said local agent position and said remote party location when no recorded signals remain in said queue.

18. The system of claim 12 wherein the call processing unit terminates the call when the call classifier determines that the signals did not originate from a live party during the call.

19. A method for use in managing outgoing calls in a call center comprising the steps of:
    initiating a call to a first party from the call center via a communication medium;
    monitoring said communication medium for signals received from a location associated with said first party after said step of initiating a call;
    detecting audible signals received from the first party location via said communications medium;
    processing said audible signals in a call classifier to determine whether said audible signals were generated by a live party during the call;
    storing said audible signals in a storage medium while said audible signals are being processed by said call classifier; and,
    when said call classifier determines that said audible signals were generated by a live party at the first party location, playing back said stored audible signals to an agent in an accelerated fashion.

20. The method of claim 19 wherein said audible signals are stored in a queue in said storage medium and said method further comprises the step of:
    determining whether the queue has been emptied.

21. The method of claim 20 further including the step of:
    establishing a realtime talk path between the called party and the agent when said queue has been emptied.

* * * * *